United States Patent
Otsu et al.

(10) Patent No.: US 11,548,341 B2
(45) Date of Patent: Jan. 10, 2023

(54) STRUT MOUNT

(71) Applicant: Prospira Corporation, Kawasaki (JP)

(72) Inventors: Kazutaka Otsu, Tokyo (JP); Musashi Hashimoto, Tokyo (JP)

(73) Assignee: Prospira Corporation, Kawasaki (JP)

( * ) Notice: Subject to any disclaimer, the term of this patent is extended or adjusted under 35 U.S.C. 154(b) by 0 days.

(21) Appl. No.: 17/292,198

(22) PCT Filed: Dec. 4, 2019

(86) PCT No.: PCT/JP2019/047306
§ 371 (c)(1),
(2) Date: May 7, 2021

(87) PCT Pub. No.: WO2020/116483
PCT Pub. Date: Jun. 11, 2020

(65) Prior Publication Data
US 2021/0387493 A1 Dec. 16, 2021

(30) Foreign Application Priority Data
Dec. 4, 2018 (JP) .............................. JP2018-227632

(51) Int. Cl.
*B60G 11/16* (2006.01)
*F16F 1/38* (2006.01)
*F16F 9/54* (2006.01)

(52) U.S. Cl.
CPC ................ *B60G 11/16* (2013.01); *F16F 1/38* (2013.01); *F16F 9/54* (2013.01); *B60G 2204/143* (2013.01)

(58) Field of Classification Search
CPC .. B60G 2204/41044; B60G 2204/4104; B60G 2204/143; B60G 11/16; F16F 9/54; F16F 1/38
See application file for complete search history.

(56) References Cited

U.S. PATENT DOCUMENTS 4,290,626 A * 9/1981 Sullivan, Jr. ......... B60G 15/068
280/124.155
4,465,296 A 8/1984 Shiratori et al.
(Continued)

FOREIGN PATENT DOCUMENTS

GB 2347905 A * 9/2000 ............. B60G 11/16
JP 58-077945 A 5/1983
(Continued)

OTHER PUBLICATIONS

International Search Report for PCT/JP2019/047306, dated Feb. 18, 2020.
(Continued)

*Primary Examiner* — Paul N Dickson
*Assistant Examiner* — Maxwell L Meshaka
(74) *Attorney, Agent, or Firm* — Kenja IP Law PC

(57) ABSTRACT

A strut mount includes an inner member, an outer member, and a body rubber. A stopper rubber which protrudes outward in an axial direction is disposed on the body rubber. The outer member includes a supporting portion which covers the stopper rubber from outside thereof in the axial direction. The stopper rubber includes a pedestal protrusion portion which protrudes outward in the axial direction from the inner member and a tip protrusion portion which protrudes outward in the axial direction from the pedestal protrusion portion, contacts the supporting portion, and has an elasticity in the axial direction lower than that of the pedestal protrusion portion. The pedestal protrusion portion and the tip protrusion portion taper outward in the axial direction.

4 Claims, 5 Drawing Sheets

(56) References Cited

U.S. PATENT DOCUMENTS

| | | | | |
|---|---|---|---|---|
| 4,478,396 | A | * | 10/1984 | Kawaura .............. B60G 15/068 267/141.1 |
| 4,486,028 | A | * | 12/1984 | Tanahashi ............ B60G 15/068 280/124.147 |
| 2002/0113398 | A1 | * | 8/2002 | Berner .................... B60G 11/16 280/124.155 |
| 2003/0178269 | A1 | * | 9/2003 | Hayashi ................ F16F 1/3814 188/321.11 |
| 2010/0327501 | A1 | | 12/2010 | Neureder |
| 2013/0168941 | A1 | * | 7/2013 | Takagi ...................... F16F 9/54 280/124.116 |
| 2022/0063363 | A1 | * | 3/2022 | Kang ..................... B60G 11/16 |

FOREIGN PATENT DOCUMENTS

| | | |
|---|---|---|
| JP | S61145012 U | 9/1986 |
| JP | 09-014327 A | 1/1997 |
| JP | 2006057791 A | 3/2006 |
| JP | 2006-281827 A | 10/2006 |
| JP | 2008100627 A | 5/2008 |
| JP | 2012-206636 A | 10/2012 |

OTHER PUBLICATIONS

Aug. 4, 2022, search result of the Extended European Search Report issued by the European Patent Office in the corresponding European Patent Application No. 19891828.6.

\* cited by examiner

STRUT MOUNT

CROSS REFERENCE TO RELATED APPLICATIONS

This application is a National Stage of International Application No. PCT/JP2019/047306 filed Dec. 4, 2019, claiming priority based on Japanese Patent Application No. 2018-227632 filed Dec. 4, 2018.

TECHNICAL FIELD

The present invention relates to a strut mount.
Priority is claimed on Japanese Patent Application No. 2018-227632, filed Dec. 4, 2018, the content of which is incorporated herein by reference.

BACKGROUND ART

Conventionally, there is known a strut mount including an annular inner member into which an upper end portion of a rod of a shock absorber is inserted and fixed, an outer member that surrounds the inner member in a circumferential direction around a center axis of the inner member and is attached to a vehicle body, and a body rubber that is disposed between the inner member and the outer member and supports the inner member and the outer member such that the inner and outer members are elastically shiftable relative to each other. As such a kind of strut mount, for example, as shown in Patent Document 1 below, there is known a configuration in which a stopper rubber protruding outward in the axial direction along the center axis is disposed in the inner member and the outer member includes a supporting portion covering the stopper rubber from outside thereof in the axial direction.

RELATED ART DOCUMENTS

Patent Document

[Patent Document 1]
Japanese Unexamined Patent Application, First Publication No. S58-77945

SUMMARY

Technical Problem

However, in the conventional strut mount, there is a possibility that an elasticity may increase and an impact force or abnormal noise may be generated when the inner member and the outer member are shifted relative to each other in the axial direction and when the inner member and the outer member are shifted relative to each other in the prying direction and their center axes are tilted away from each other due to the input of vibration.

The present invention has been made in view of the above-described circumstances and an object of the present invention is to provide a strut mount capable of suppressing an impact force or abnormal noise generated when vibration in each of an axial direction and a prying direction is input.

Solution to Problem

In order to solve the above-described problems, the present invention proposes the following means.

A strut mount of an aspect of the present invention includes: an annular inner member into which an upper end portion of a rod of a shock absorber is inserted and fixed; an outer member that surrounds the inner member in a circumferential direction around a center axis of the inner member and is attached to a vehicle body, and a body rubber which is disposed between the inner member and the outer member and supports the inner member and the outer member such that the inner and outer members are elastically shiftable relative to each other. A stopper rubber which protrudes outward in an axial direction along the center axis is disposed on the body rubber. The outer member includes a supporting portion which covers the stopper rubber from outside thereof in the axial direction. The stopper rubber includes a pedestal protrusion portion which protrudes outward in the axial direction from the inner member and a tip protrusion portion which protrudes outward in the axial direction from the pedestal protrusion portion, contacts the supporting portion, and has an elasticity in the axial direction lower than that of the pedestal protrusion portion. The pedestal protrusion portion and the tip protrusion portion taper outward in the axial direction. The pedestal protrusion portion includes an inner surface which is located at an inner end portion in a radial direction of the pedestal protrusion portion and extends outward in the axial direction from the inner member, and includes an outer surface which extends inward in the axial direction and outward in the radial direction from an outer end portion in the axial direction of the inner surface. A tilt angle of the outer surface with respect to a horizontal line orthogonal to the center axis is less than a tilt angle of the inner surface with respect to the horizontal line. The tip protrusion portion is disposed on the outer surface.

DETAILED DESCRIPTION

Figure 1:
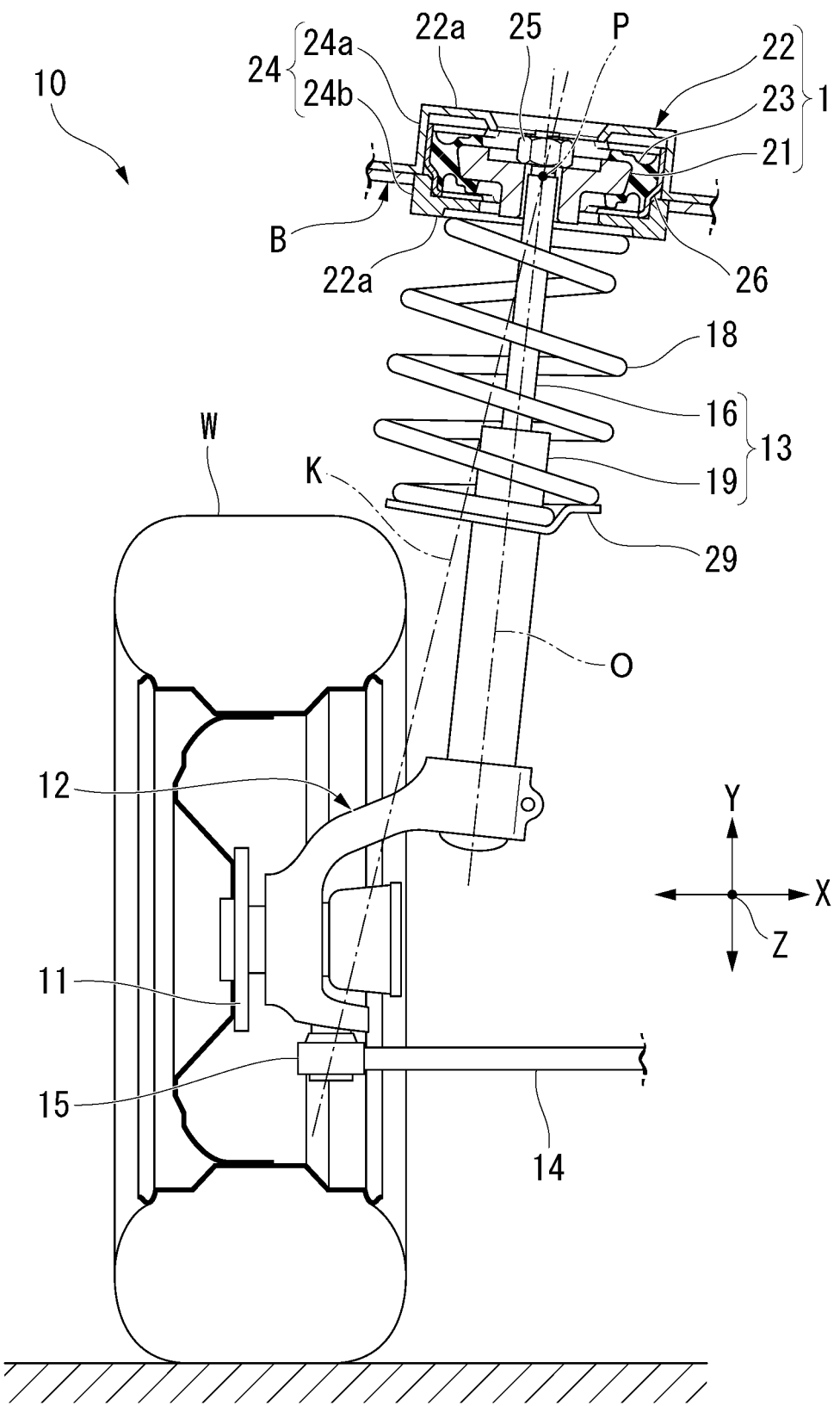
FIG. 1 is a cross-sectional view, in a left/right direction of a vehicle, of a main part of a strut suspension device including a strut mount according to an embodiment of the present invention.

Hereinafter, an embodiment of a strut mount according to the present invention will be described based on an example applied to a strut suspension device 10 with reference to FIGS. 1 to 5. In addition, the strut suspension device 10 is provided in a vehicle (not shown). In the description below, in the strut suspension device 10, the installation side of a strut mount 1 to be described later is referred to as the upper side and the installation side of a lower arm 14 to be described later is referred to as the lower side.

The strut suspension device 10 includes a hub 11 which rotatably supports a vehicle wheel (front wheel) W, a knuckle 12 which protrudes from the hub 11 toward inside in the left/right direction X of the vehicle (toward the center of the vehicle in the left/right direction X of the vehicle), a shock absorber 13 which is provided on the knuckle 12 to stand upward, the strut mount 1 to which an upper end portion of a rod 16 of the shock absorber 13 is attached, a lower arm 14 which is located below a lower end portion of the shock absorber 13 and extends from the knuckle 12 toward inside in the left/right direction X of the vehicle, a ball joint 15 which connects the lower arm 14 and the knuckle 12, and a spring 18 which supports the rod 16 and the strut mount 1 integrally such that they are movable downward while being biased upward and also includes a tie rod and a braking device (not shown) and the like.

The shock absorber 13 extends inward in the left/right direction X of the vehicle and upward and includes a rod 16 and a cylinder 19. The rod 16 and the cylinder 19 are arranged coaxially with a common axis. Hereinafter, this common axis is referred to as a center axis O, a direction intersecting the center axis O when viewed from the axial direction along the center axis O is referred to as a radial direction, and a direction around the center axis O when viewed from the axial direction is referred to as a circumferential direction.

The rod 16 protrudes upward from the cylinder 19. A male thread portion is formed at an upper end portion of the rod 16. A lower end portion of the cylinder 19 is located inside in the left/right direction X of the vehicle (the side close to the center of the vehicle in the left/right direction X of the vehicle) in relation to the ball joint 15. The lower end portion of the cylinder 19 is located above the ball joint 15. The lower end portion of the cylinder 19 is fixed to the knuckle 12. A lower receiving plate 29 which supports a lower end portion of the spring 18 is attached to an outer peripheral surface of the cylinder 19.

The strut mount 1 includes an annular inner member 21 into which the upper end portion of the rod 16 of the shock absorber 13 is inserted and fixed, an outer member 22 that is attached to a vehicle body B to surround the inner member 21 in the circumferential direction, and a body rubber 23 which is disposed between the inner member 21 and the outer member 22 and supports the inner member 21 and the outer member 22 such that the inner member 21 and outer member 22 are elastically shiftable relative to each other.

A nut 25 is threaded to a portion of the upper end portion of the rod 16 protruding upward from the inner member 21, and the upper end portion of the rod 16 is fixed to the inner member 21. The inner member 21 is disposed coaxially with the center axis O.

The outer member 22 includes an inner cylinder portion 26 which surrounds the inner member 21 from outside thereof in the radial direction, and an outer cylinder portion 24 into which the inner cylinder portion 26 is fitted. The inner cylinder portion 26 and the outer cylinder portion 24 are arranged coaxially with the center axis O.

Figure 3:
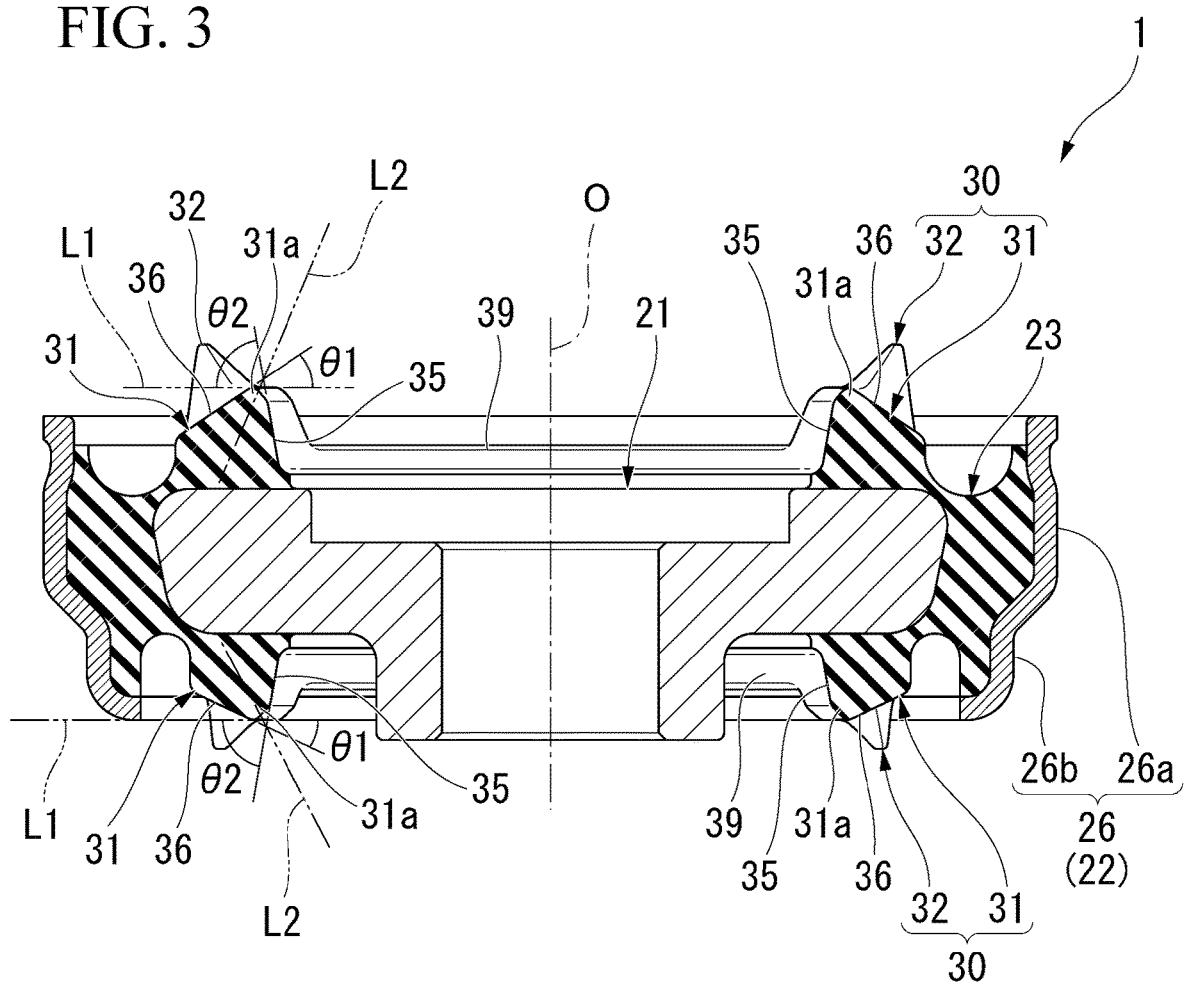
FIG. 3 is a cross-sectional view along a line of the strut mount shown in FIG. 2.
Figure 4:
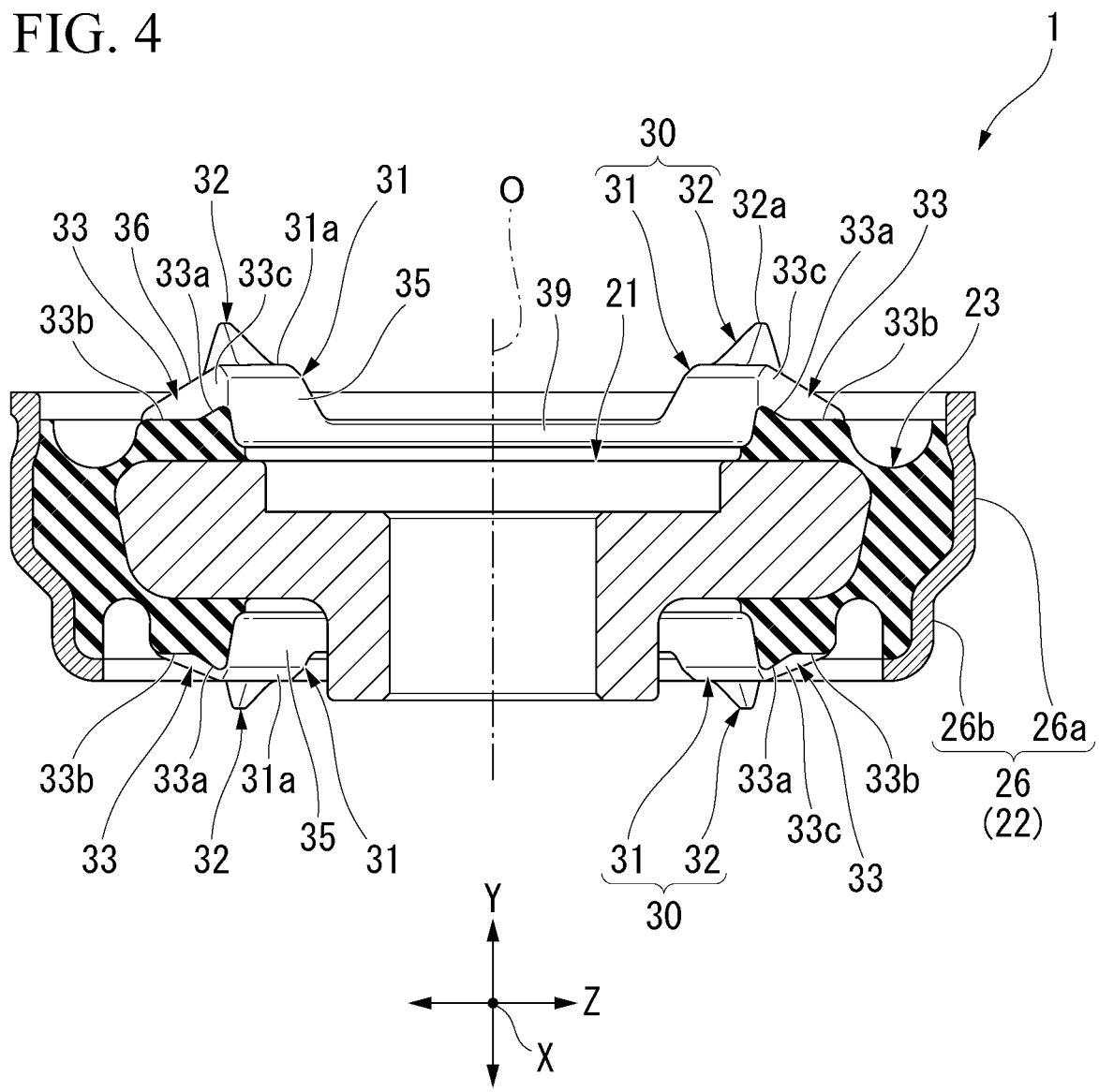
FIG. 4 is a cross-sectional view along a line IV-IV of the strut mount shown in FIG. 2.
Figure 5:
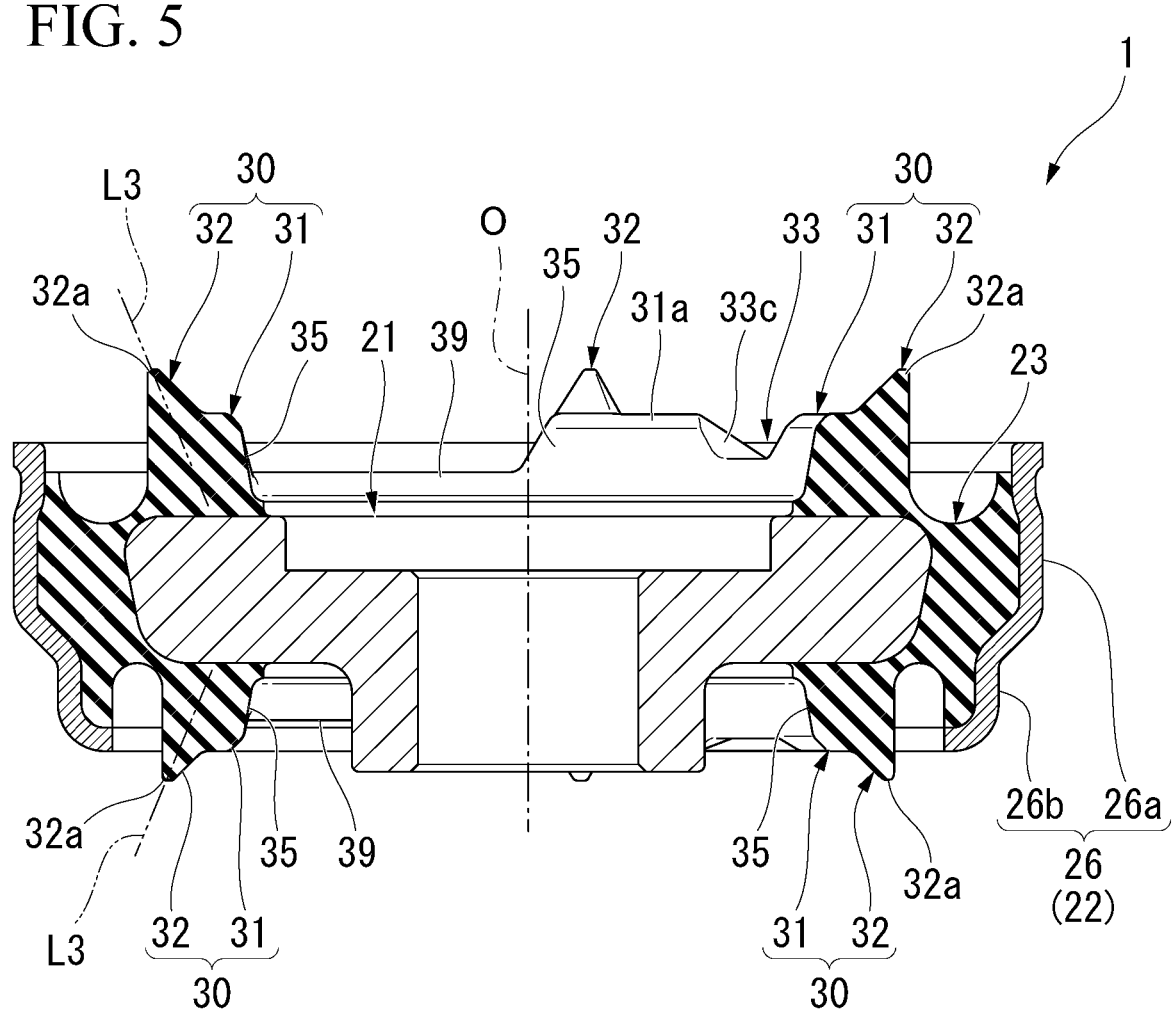
FIG. 5 is a cross-sectional view along a line V-V of the strut mount shown in FIG. 2.

As shown in FIGS. 3 to 5, in the inner cylinder portion 26, the inner and outer diameters of an upper portion 26a are larger than the inner and outer diameters of a lower portion 26b.

As shown in FIG. 1, the outer cylinder portion 24 is divided in the axial direction. That is, the outer cylinder portion 24 includes an upper portion 24a and a lower portion 24b, and the lower portion 24b is provided at a position closer to the knuckle 12 than the upper portion 24a. The upper portion 26a of the inner cylinder portion 26 is fitted into the upper portion 24a of the outer cylinder portion 24, and the lower portion 26b of the inner cylinder portion 26 is fitted into the lower portion 24b of the outer cylinder portion 24. A lower end portion of the upper portion 24a of the outer cylinder portion 24 is provided with a flange portion which protrudes outward in the radial direction and is disposed on the upper surface of the vehicle body B. An upper end portion of the lower portion 24b of the outer cylinder portion 24 is fitted to an attachment hole formed in the vehicle body B.

The body rubber 23 connects an inner peripheral surface of the inner cylinder portion 26 and an outer peripheral surface of the inner member 21. The body rubber 23 is formed in an annular shape and is disposed coaxially with the center axis O. As shown in FIGS. 2 to 5, stopper rubbers 30 which protrude outward in the axial direction are disposed on the body rubber 23. The stopper rubbers 30 are integrally formed with the body rubber 23. An elastic center of the body rubber 23 is located on the center axis O.

As shown in FIG. 1, the outer member 22 includes a pair of supporting portions 22a which cover the body rubber 23 from both sides in the axial direction. The supporting portions 22a cover the stopper rubbers 30 from outside thereof in the axial direction. In the example shown in the drawings, the supporting portions 22a are respectively disposed at an upper end portion of the upper portion 24a of the outer cylinder portion 24 and a lower end portion of the lower portion 24b of the outer cylinder portion 24. The pair of supporting portions 22a cover an outer peripheral edge portion of the inner member 21 from both sides in the axial direction. The pair of supporting portions 22a are formed in annular shapes and are disposed coaxially with the center axis O. A lower surface of the supporting portion 22a, which is located at the lower side, of the pair of supporting portions 22a supports an upper end portion of the spring 18.

Here, a tie rod (not shown) is connected to an end portion of the knuckle 12 in the forward/rearward direction Z of the vehicle. At the time of steering, the tie rod pushes the end portion of the knuckle 12 in the forward/rearward direction Z of the vehicle outward in the left/right direction X of the vehicle or pulls the end portion inward in the left/right direction X of the vehicle, and the knuckle 12 and the vehicle wheel W integrally rotate around a kingpin axis K connecting the center of the ball joint 15 and a connection portion P which connects the rod 16 and the inner member 21. The connection portion P serves as, for example, the elastic center of the body rubber 23.

The kingpin axis K extends outward in the left/right direction X of the vehicle and downward from above. When viewed from the forward/rearward direction Z of the vehicle, the tilt angle of the kingpin axis K with respect to the upward/downward direction Y becomes larger than the tilt angle of the center axis O with respect to the upward/downward direction Y. Accordingly, at the time of steering, the shock absorber 13 rotates around the connection portion P between the rod 16 and the inner member 21 in the forward/rearward direction Z of the vehicle with respect to the outer member 22.

The stopper rubbers 30 are disposed on both sides of the center axis O in the forward/rearward direction Z of the vehicle when viewed from the left/right direction X of the vehicle.

Then, when the shock absorber 13 rotates around the connection portion P between the rod 16 and the inner member 21 and rotates in the forward/rearward direction Z of the vehicle with respect to the outer member 22 following the steering, the stopper rubbers 30 abut the supporting portions 22a of the outer member 22 to be compressed and deformed and generate a reaction force applied to the rod 16 around the connection portion P.

The stopper rubbers 30 protrude from both sides of the inner member 21 in the axial direction and respectively face the pair of supporting portions 22a in the axial direction. As shown in FIGS. 3 to 5, the sizes of the stopper rubbers 30 disposed on the upper and lower surfaces of the inner member 21 are set to be substantially equal to each other and the shapes thereof are substantially symmetric to each other in the upward/downward direction. In the example shown in the drawings, the sizes of the stopper rubbers 30 disposed on the upper surface of the inner member 21 are slightly larger than the sizes of the stopper rubbers 30 disposed on the lower surface of the inner member 21. The stopper rubbers 30 abut the supporting portions 22a.

Figure 2:
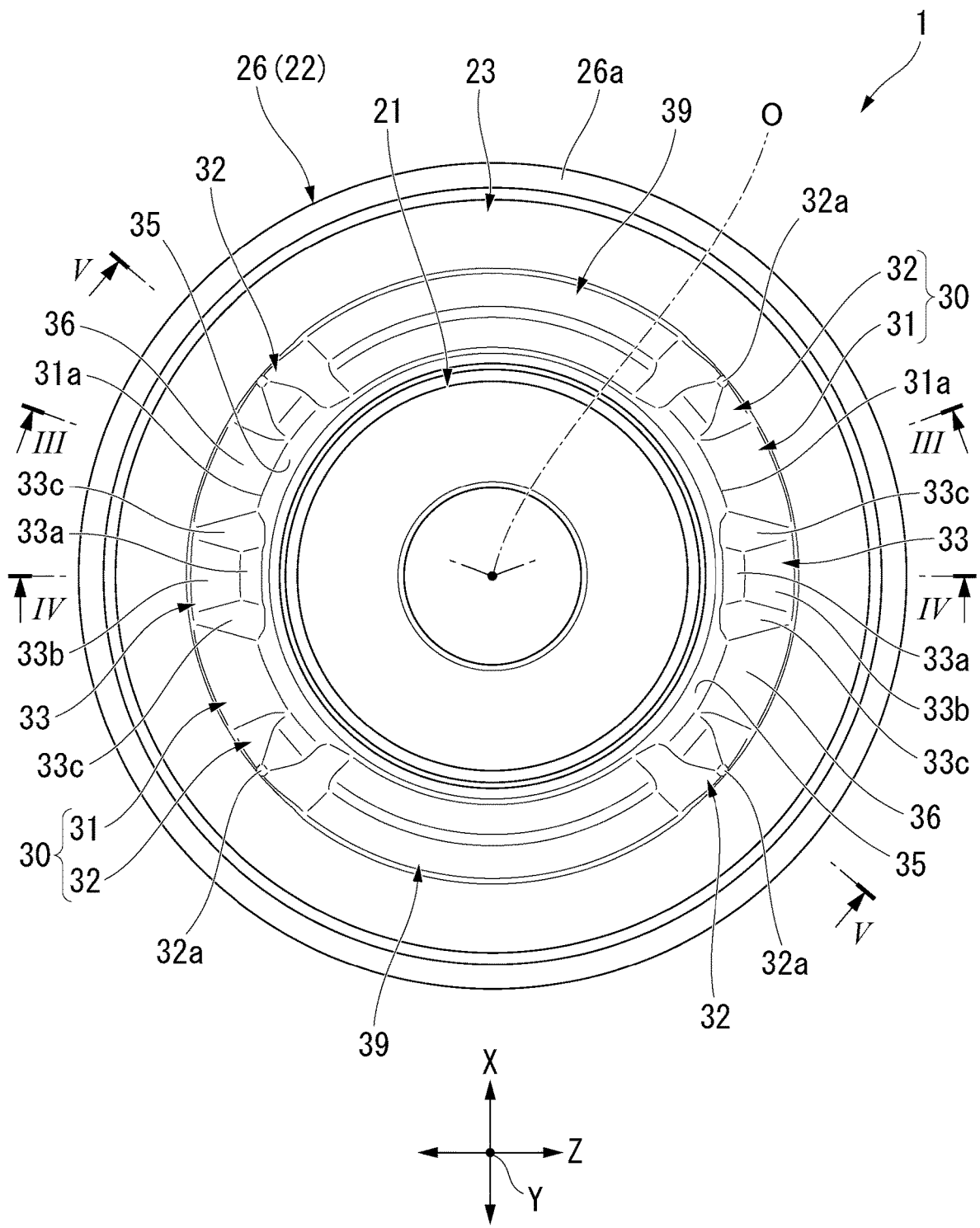
FIG. 2 is a plan view of the strut mount shown in FIG. 1.

As shown in FIG. 2, a covering rubber 39 is disposed in each of the portions, on the outer peripheral edge portion of the inner member 21, located on both sides of the center axis O in the left/right direction X of the vehicle. The covering rubbers 39 are disposed on the upper and lower surfaces of the outer peripheral edge portion of the inner member 21. The covering rubber 39 is integrally formed with the body rubber 23. An axial gap is formed between the covering rubber 39 and the supporting portion 22a. The volume of the covering rubber 39 is smaller than the volume of the stopper rubbers 30.

Then, a reaction force applied to the rod 16 when the shock absorber 13 rotates around the connection portion P in the forward/rearward direction Z of the vehicle with respect to the outer member 22 is larger than a reaction force applied to the rod 16 when the shock absorber 13 rotates around the connection portion P in the left/right direction X of the vehicle with respect to the outer member 22.

The reaction force around the connection portion P generated in the rod 16 and the sliding resistance of the rod 16 in the axial direction with respect to the cylinder 19 gradually increase as the rotational movement amount of the shock absorber 13 around the connection portion P with respect to the outer member 22 in the forward/rearward direction Z of the vehicle increases. The relationship between the rotational movement amount and the sliding resistance can be adjusted by designing the size, material, and the like of the stopper rubbers 30 according to the characteristics of the shock absorber 13.

Further, in this embodiment, the stopper rubber 30 includes a pedestal protrusion portion 31 and tip protrusion portions 32.

As shown in FIG. 3, the pedestal protrusion portions 31 protrude outward in the axial direction from the inner member 21. The pedestal protrusion portions 31 are located in the outer peripheral edge portion of the inner member 21 and are connected to the inner peripheral edge portion of the body rubber 23. Two pedestal protrusion portions 31 extend in the circumferential direction and are arranged over an angle range of about 90° about the center axis O. The two pedestal protrusion portions 31 are arranged at positions separated from each other by about 180° about the center axis O. In this embodiment, the two pedestal protrusion portions 31 are provided on the upper and lower sides of the inner member 21.

The height of the pedestal protrusion portions 31 in the axial direction is equal to the thickness of the pedestal protrusion portions 31 in the radial direction. The length of the pedestal protrusion portions 31 in the circumferential direction is larger than the height and the thickness of the pedestal protrusion portions 31.

The pedestal protrusion portion 31 includes an inner surface 35 which is located at the inner end portion of the pedestal protrusion portion 31 in the radial direction and extends outward in the axial direction from the inner member 21, and includes an outer surface 36 which extends inward in the axial direction (toward the inner member 21 in the axial direction) and outward in the radial direction from the axial outer end portion of the inner surface 35. The pedestal protrusion portion 31 tapers outward in the axial direction. In other words, an angle formed by the inner surface 35 and the outer surface 36 of the pedestal protrusion portion 31 is an acute angle. The gap between the inner surface 35 and the outer surface 36 of the pedestal protrusion portion 31 in the radial direction gradually decreases outward in the axial direction.

In the example shown in the drawings, the inner surface 35 extends outward in the radial direction and outward in the axial direction from the inner member 21. Additionally, the inner surface 35 may extend straightly in the axial direction from the inner member 21 or may extend inward in the radial direction and outward in the axial direction from the inner member 21.

In the longitudinal sectional view in the axial direction shown in FIG. 3, the lengths of the inner surface 35 and the outer surface 36 are equal to each other. A tilt angle θ1 of the outer surface 36 with respect to the horizontal line L1 orthogonal to the center axis O becomes less than a tilt angle θ2 of the inner surface 35 with respect to the horizontal line L1.

An outer end portion of the inner surface 35 in the axial direction and an inner end portion of the outer surface 36 in the radial direction are connected to each other through a top portion 31a of the pedestal protrusion portion 31 which tapers outward in the axial direction. The top portion 31a is formed in a curved surface shape protruding outward in the axial direction. The top portion 31a faces inward in the radial direction. That is, in the longitudinal sectional view shown in FIG. 3, a bisector L2 of an angle of the top portion 31a is tilted inward in the radial direction with respect to the axial direction.

As shown in FIGS. 2 and 4, the intermediate portion of the pedestal protrusion portion 31 in the circumferential direction is provided with a recess portion 33 which is depressed inward in the axial direction and penetrates the intermediate portion in the radial direction. The recess portion 33 is formed at the intermediate part of the pedestal protrusion portion 31 in the circumferential direction. The circumferential size of the recess portion 33 is about a half of the circumferential size of each of the portions of the pedestal protrusion portion 31 located on both sides of the recess portion 33 in the circumferential direction. A bottom surface of the recess portion 33 includes an inclined portion 33a which is located at the inner end portion of the bottom surface of the recess portion 33 in the radial direction and extends outward in the axial direction and inward in the radial direction and a flat portion 33b which extends outward in the radial direction and extends in a direction orthogonal to the axial direction from the inclined portion 33a. Both side surfaces 33c of the recess portion 33 are inclined in the axial direction to be gradually spaced from each other in the circumferential direction as the side surfaces 33c extend inward in the radial direction.

The plurality of tip protrusion portions 32 are provided at intervals in the circumferential direction. The elasticity of the tip protrusion portion 32 in the axial direction is lower than that of the pedestal protrusion portion 31. That is, the elastic modulus of the tip protrusion portion 32 in the axial direction is smaller than the elastic modulus of the pedestal protrusion portion 31 in the axial direction. In the example shown in the drawings, the tip protrusion portion 32 and the pedestal protrusion portion 31 are integrally formed of the same material and the tip protrusion portion 32 is more easily deformed in the axial direction than the pedestal protrusion portion 31 due to a shape and a size.

In the example shown in the drawings, the tip protrusion portion 32 is formed in a conical or a pyramidal shape that tapers outward in the axial direction and the height of the tip protrusion portion 32 and the outer diameter of the bottom portion of the tip protrusion portion 32 are equal to each other. The volume of the tip protrusion portion 32 is smaller than the volume of the pedestal protrusion portion 31. In other words, an angle formed between an outer radial surface and an inner radial surface of the tip protrusion portion 32 is an acute angle. The radial gap between the outer radial surface and the inner radial surface of the tip protrusion portion 32 (a radial width of the tip protrusion portion 32) gradually decreases outward in the axial direction. Further, in this embodiment, the angle formed between two surfaces facing the circumferential direction in the tip protrusion portion 32 is an acute angle. The circumferential gap between two surfaces of the tip protrusion portion 32 facing each other in the circumferential direction (the circumferential width of the tip protrusion portion 32) gradually decreases outward in the axial direction. Additionally, only one of the radial width of the tip protrusion portion 32 and the circumferential width of the tip protrusion portion 32 may gradually decrease outward in the axial direction.

The tip protrusion portion 32 is disposed on the outer surface 36 of the pedestal protrusion portion 31. The tip protrusion portion 32 is disposed at each of both end portions of the pedestal protrusion portion 31 in the circumferential direction. Two tip protrusion portions 32 are provided in one pedestal protrusion portion 31. A surface of the surfaces of the tip protrusion portion 32 facing outside in the circumferential direction (a surface of one tip protrusion portion 32 on the side away from the other tip protrusion portion 32 in the circumferential direction) is flush with a circumferential end surface of the pedestal protrusion portion 31. The circumferential size of the tip protrusion portion 32 is about a half of the circumferential size of each of the portions of the pedestal protrusion portion 31 located on both sides of the recess portion 33 in the circumferential direction.

The tip protrusion portion 32 is disposed on a portion of the outer surface 36 of the pedestal protrusion portion 31 located outside in the radial direction of the inner end portion in the radial direction. In the longitudinal sectional view shown in FIG. 3, the length of the bottom portion of the tip protrusion portion 32 is longer than a half of the length of the outer surface 36. A surface, which faces outside in the radial direction, of the surface of the tip protrusion portion 32 is continuously connected to the radial outer edge of the outer surface 36 of the pedestal protrusion portion 31 without a step. A top portion 32a of the tip protrusion portion 32 faces outside in the radial direction. That is, in the longitudinal sectional view, a bisector L3 of the angle of the top portion 32a is tilted outward in the radial direction with respect to the axial direction. In the longitudinal sectional view, the tilt angle of a bisector L3 of an angle of the top portion 32a of the tip protrusion portion 32 with respect to the axial direction is less than the tilt angle of a bisector L2 of an angle of the top portion 31a of the pedestal protrusion portion 31 with respect to the axial direction.

As described above, according to the strut mount 1 of this embodiment, since the stopper rubber 30 includes the pedestal protrusion portion 31 and the tip protrusion portion 32 having an elasticity lower than that of the pedestal protrusion portion 31 in the axial direction, the vibration is absorbed, when the vibration is input, by allowing the elasticity of the stopper rubber 30 to be low until the supporting portion 22a comes into contact with the pedestal protrusion portion 31 while the inner member 21 and the outer member 22 are shifted relative to each other in the axial direction, and, after the supporting portion 22a comes into contact with the pedestal protrusion portion 31, the shift can be suppressed by allowing the elasticity of the stopper rubber 30 to be increased.

Further, since the pedestal protrusion portion 31 and the tip protrusion portion 32 taper outward in the axial direction, the elasticity of each of the pedestal protrusion portion 31 and the tip protrusion portion 32 can be initially low and gradually increased while being pushed in the axial direction by the supporting portion 22a. Thus, it is possible to suppress the elasticity of the stopper rubber 30 from being suddenly increased and suppress an impact force or abnormal noise when the supporting portion 22a contacting the tip protrusion portion 32 abuts against the pedestal protrusion portion 31 while the stopper rubber 30 is pushed in the axial direction by the supporting portion 22a.

Further, since the stopper rubber 30 includes the tip protrusion portion 32 which protrudes outward in the axial direction from the pedestal protrusion portion 31 and abuts against the supporting portion 22a, it is possible to suppress the difference of the relative position of the inner member 21 and the outer member 22 in the axial direction by allowing the tip protrusion portion 32 to abut against the supporting portion 22a when manufacturing the strut mount 1 and easily and reliably ensure an axial gap between the pedestal protrusion portion 31 and the supporting portion 22a as designed.

Further, the tip protrusion portion 32 is disposed on the outer surface 36 of the pedestal protrusion portion 31 and the outer surface 36 extends inward in the axial direction and outward in the radial direction from the axial outer end portion of the inner surface 35 of the pedestal protrusion portion 31. Thus, the top portion 32a of the tip protrusion portion 32 which tapers outward in the axial direction faces outward in the radial direction and when the tip protrusion portion 32 is pushed by the supporting portion 22a in the axial direction, the tip protrusion portion 32 is deformed outward in the radial direction to follow the deformation of the body rubber 23. Accordingly, the elasticity of the stopper rubber 30 can be reliably maintained in a low state until the supporting portion 22a abuts against the pedestal protrusion portion 31 while the inner member 21 and the outer member 22 are shifted relative to each other in the axial direction due to the input of vibration.

Further, the pedestal protrusion portion 31 includes the inner surface 35 and the outer surface 36 and the tilt angle θ1 of the outer surface 36 with respect to the horizontal line L1 is less than the tilt angle θ2 of the inner surface 35. Thus, the top portion 31a of the pedestal protrusion portion 31 which tapers outward in the axial direction faces inward in the radial direction and when the inner member 21 and the outer member 22 are shifted relative to each other in the prying direction such that their center axes are tilted relative to each other, the top portion 31a of the pedestal protrusion portion 31 can be made not to be easily in pressure contact with the supporting portion 22a. Accordingly, it is possible to suppress the elasticity of the stopper rubber 30 from being increased and suppress an impact force or abnormal noise.

Further, since the top portion 31a of the pedestal protrusion portion 31 faces inward in the radial direction, the pedestal protrusion portion 31 can be deformed inward in the radial direction when the pedestal protrusion portion 31 is pushed in the axial direction by the supporting portion 22a. Thus, since it is possible to suppress the pedestal protrusion portion 31 from being deformed due to the deformation of the body rubber 23 when the inner member 21 and the outer member 22 are largely shifted relative to each other in the axial direction, the elasticity of the stopper rubber 30 can be increased and the further shift in the axial direction can be suppressed.

Further, since the tip protrusion portion 32 is disposed at each of both end portions of the pedestal protrusion portion 31 in the circumferential direction, it is possible to ensure a long circumferential distance between the tip protrusion portions 32 adjacent to each other in the circumferential direction and easily realize that the plurality of tip protrusion portions 32 abut against the supporting portion 22a with an equal force.

Further, since the recess portion 33 is formed at the intermediate portion of the pedestal protrusion portion 31 in the circumferential direction, while the stopper rubber 30 is pushed by the supporting portion 22a in the axial direction, it is possible to easily adjust the magnitude of the elasticity of the stopper rubber 30 after the supporting portion 22a abuts against the pedestal protrusion portion 31.

Further, since the tip protrusion portion 32 is disposed on a portion of the outer surface 36 of the pedestal protrusion portion 31 located outside in the radial direction of the inner end portion in the radial direction of the outer surface 36, it is possible to ensure a long circumferential distance between the tip protrusion portions 32 adjacent to each other in the circumferential direction and easily realize that the plurality of tip protrusion portions 32 abut against the supporting portion 22a with an equal force.

Additionally, the technical scope of the present invention is not limited to the above-described embodiment and can be modified into various forms in the scope not departing from the scope of the present invention.

For example, in the above-described embodiment, a configuration in which the stopper rubbers 30 are disposed on both sides of the center axis O in the forward/rearward direction Z of the vehicle when viewed from the left and right direction X of the vehicle has been described, but the arrangement positions of the stopper rubbers 30 may be changed as appropriate.

Further, in the above-described embodiment, the sizes of the stopper rubbers 30 disposed on the upper and lower surfaces of the inner member 21 are set to be substantially equal to each other and the shapes thereof are substantially symmetric to each other in the upward/downward direction. However, these stopper rubbers 30 may have different sizes and shapes.

Further, the stopper rubber 30 may adopt a configuration in which the stopper rubber continuously extends over the entire circumference without the recess portion 33.

Further, the covering rubber 39 is disposed at each of the portions of the inner member 21 on both sides of the center axis O in the left/right direction X of the vehicle, but the covering rubber 39 may not be provided.

Further, the tip protrusion portion 32 may be disposed on the intermediate portion of the pedestal protrusion portion 31 in the circumferential direction.

In addition, the constituent elements in the above-described embodiment can be appropriately replaced with well-known constituent elements without departing from the scope of the present invention and the above-described modified examples may be appropriately combined.

In the above-described aspect of the present invention, since the stopper rubber (30) includes a pedestal protrusion portion (31) and a tip protrusion portion (32) having an elasticity lower than that of the pedestal protrusion portion in the axial direction, the vibration is absorbed, when the vibration is input, by allowing the elasticity of the stopper rubber to be low until the supporting portion (22a) comes into contact with the pedestal protrusion portion while the inner member (21) and the outer member (22) are shifted relative to each other in the axial direction, and, after the supporting portion comes into contact with the pedestal protrusion portion, the shift can be suppressed by allowing the elasticity of the stopper rubber to be increased.

Further, since the pedestal protrusion portion and the tip protrusion portion taper outward in the axial direction, the elasticity of each of the pedestal protrusion portion and the tip protrusion portion can be initially low and gradually increased while being pushed in the axial direction by the supporting portion. Thus, it is possible to suppress the elasticity of the stopper rubber from being suddenly increased and suppress an impact force or abnormal noise when the supporting portion contacting the tip protrusion portion abuts against the pedestal protrusion portion while the stopper rubber is pushed in the axial direction by the supporting portion.

Further, since the stopper rubber includes the tip protrusion portion which protrudes outward in the axial direction from the pedestal protrusion portion and abuts against the supporting portion, it is possible to suppress the difference of the relative position of the inner member and the outer member in the axial direction by allowing the tip protrusion portion to abut against the supporting portion when manufacturing the strut mount (1) and easily and reliably ensure an axial gap between the pedestal protrusion portion and the supporting portion as designed.

Further, the tip protrusion portion is disposed on the outer surface (36) of the pedestal protrusion portion and the outer surface extends inward in the axial direction and outward in the radial direction from the axial outer end portion of the inner surface (35) of the pedestal protrusion portion. Thus, the top portion of the tip protrusion portion which tapers outward in the axial direction faces outward in the radial direction and when the tip protrusion portion is pushed by the supporting portion in the axial direction, the tip protrusion portion can be deformed outward in the radial direction to follow the deformation of the body rubber (23). Accordingly, the elasticity of the stopper rubber can be reliably maintained in a low state until the supporting portion abuts against the pedestal protrusion portion while the inner member and the outer member are shifted relative to each other in the axial direction due to the input of vibration.

Further, the pedestal protrusion portion includes the inner surface and the outer surface and the tilt angle of the outer surface with respect to the horizontal line is less than the tilt angle of the inner surface. Thus, the top portion of the pedestal protrusion portion which tapers outward in the axial direction faces inward in the radial direction and when the inner member and the outer member are shifted relative to each other in the prying direction such that their center axes are tilted relative to each other, the top portion of the pedestal protrusion portion can be made not to be easily in pressure contact with the supporting portion. Accordingly, it is possible to suppress the elasticity of the stopper rubber from being increased and suppress an impact force or abnormal noise.

Further, since the top portion of the pedestal protrusion portion faces inward in the radial direction, the pedestal protrusion portion can be deformed inward in the radial direction when the pedestal protrusion portion is pushed in the axial direction by the supporting portion. Thus, since it is possible to suppress the pedestal protrusion portion from being deformed due to the deformation of the body rubber when the inner member and the outer member are largely shifted relative to each other in the axial direction, the elasticity of the stopper rubber can be increased and the further shift in the axial direction can be suppressed.

Here, in the above-described aspect, the pedestal protrusion portion may extend in the circumferential direction and the tip protrusion portion may be disposed at each of both end portions of the pedestal protrusion portion in the circumferential direction.

In this case, since the tip protrusion portion is disposed at each of both end portions of the pedestal protrusion portion in the circumferential direction, it is possible to ensure a long circumferential distance between the tip protrusion portions adjacent to each other in the circumferential direction and easily realize that the plurality of tip protrusion portions abut against the supporting portion with an equal force.

Further, in the above-described aspect, the pedestal protrusion portion may extend in the circumferential direction and an intermediate portion of the pedestal protrusion portion in the circumferential direction may be provided with a recess portion (33) which is depressed inward in the axial direction and penetrates the intermediate portion in the radial direction.

In this case, since the recess portion is formed at the intermediate portion of the pedestal protrusion portion in the circumferential direction, while the stopper rubber is pushed by the supporting portion in the axial direction, it is possible to easily adjust the magnitude of the elasticity of the stopper rubber after the supporting portion abuts against the pedestal protrusion portion.

Further, in the above-described aspect, a plurality of the tip protrusion portions may be arranged at intervals in the circumferential direction and may be arranged on portions of the outer surface located outside of inner end portion in the radial direction of the outer surface.

In this case, since the tip protrusion portion is disposed on the portion of the outer surface of the pedestal protrusion portion located outside in the radial direction of the inner end portion in the radial direction of the outer surface, it is possible to ensure a long circumferential distance between the tip protrusion portions adjacent to each other in the circumferential direction and easily realize that the plurality of tip protrusion portions abut against the supporting portion with an equal force.

According to the above-described aspect of the present invention, it is possible to suppress an impact force or abnormal noise generated when vibration in each of the axial direction and the prying direction is input.

INDUSTRIAL APPLICABILITY

The present invention can be used for a strut mount including an inner member, an outer member surrounding the inner member, and a body rubber supporting the inner member and the outer member to be elastically shiftable relative to each other.

REFERENCE SYMBOLS

1 Strut mount
13 Shock absorber
16 Rod
21 Inner member
22 Outer member
22a Supporting portion
23 Body rubber
30 Stopper rubber
31 Pedestal protrusion portion
32 Tip protrusion portion
33 Recess portion
35 Inner side surface
36 Outer side surface
B Vehicle body
L1 Horizontal line
O Center axis
θ1 Tilt angle of outer surface
θ2 Tilt angle of inner surface

What is claimed is:

1. A strut mount comprising:
an annular inner member into which an upper end portion of a rod of a shock absorber is inserted and fixed;
an outer member that surrounds the inner member in a circumferential direction around a center axis of the inner member and is attached to a vehicle body; and
a body rubber which is disposed between the inner member and the outer member and supports the inner member and the outer member such that the inner and outer members are elastically shiftable relative to each other,
wherein a stopper rubber which protrudes outward in an axial direction along the center axis is disposed on the body rubber,
wherein the outer member includes a supporting portion which covers the stopper rubber from outside thereof in the axial direction,
wherein the stopper rubber includes
a pedestal protrusion portion which protrudes outward in the axial direction from the inner member and
a tip protrusion portion which protrudes outward in the axial direction from the pedestal protrusion portion, contacts the supporting portion, and has an elasticity in the axial direction lower than that of the pedestal protrusion portion,
wherein the pedestal protrusion portion and the tip protrusion portion taper outward in the axial direction,
wherein the pedestal protrusion portion includes
an inner surface which is located at an inner end portion in a radial direction of the pedestal protrusion portion and extends outward in the axial direction from the inner member, and
an outer surface which extends inward in the axial direction and outward in the radial direction from an outer end portion in the axial direction of the inner surface,
wherein a tilt angle of the outer surface that is an angle of an acute angle formed by the outer surface with respect to a horizontal line orthogonal to the center axis is less than a tilt angle of the inner surface that is an angle of an acute angle formed by the inner surface with respect to the horizontal line, thereby a top portion of the pedestal protrusion portion which tapers outward in the axial direction and through which the inner surface and the outer surface are connected to each other facing inward in the radial direction, and
wherein the tip protrusion portion is disposed on the outer surface, thereby a top portion of the tip protrusion portion which tapers outward in the axial direction facing outward in the radial direction.

2. The strut mount according to claim 1,
wherein the pedestal protrusion portion extends in the circumferential direction, and wherein the tip protrusion portion is disposed at each of both end portions of the pedestal protrusion portion in the circumferential direction.

3. The strut mount according to claim 1,
wherein the pedestal protrusion portion extends in the circumferential direction, and
wherein an intermediate portion in the circumferential direction of the pedestal protrusion portion is provided with a recess portion which is depressed inward in the axial direction and penetrates the intermediate portion in the radial direction.

4. The strut mount according to claim 1, wherein a plurality of the tip protrusion portions are provided at intervals in the circumferential direction and are disposed on portions of the outer surface located outside in the radial direction of an inner end portion in the radial direction of the outer surface.

* * * * *